(12) United States Patent  
Negrete (10) Patent No.: US 7,463,497 B2  
(45) Date of Patent: Dec. 9, 2008

(54) REGULATOR FOR ISOLATED FLYBACK POWER SUPPLY USING PRIMARY SIDE SENSING

(75) Inventor: Michael G. Negrete, Palo Alto, CA (US)

(73) Assignee: Linear Technology Corporation, Milpitas, CA (US)

( * ) Notice: Subject to any disclaimer, the term of this patent is extended or adjusted under 35 U.S.C. 154(b) by 306 days.

(21) Appl. No.: 11/499,726

(22) Filed: Aug. 7, 2006

(65) Prior Publication Data

US 2008/0031018 A1 Feb. 7, 2008

(51) Int. Cl.
*H02M 3/335* (2006.01)
(52) U.S. Cl. .................. 363/21.13; 363/21.12
(58) Field of Classification Search .............. 363/21.13, 363/21.18, 21.12
See application file for complete search history.

(56) References Cited

U.S. PATENT DOCUMENTS 7,310,244 B2 * 12/2007 Yang et al. .................... 363/97

OTHER PUBLICATIONS

"Isolated Flyback Switching Regulator," Linear Technology LT1425, pp. 1-20.

* cited by examiner

*Primary Examiner*—Shawn Riley
(74) *Attorney, Agent, or Firm*—McDermott Will & Emery LLP (57) ABSTRACT

A regulator for an isolated flyback power supply using primary side sensing. The regulator may include an error circuit configured to generate an error signal representative of the difference between a target value and a measured value, a sample and hold circuit, and a controller circuit. The controller circuit may be configured to cause the sample and hold circuit to sample the value of a derived signal that is derived from a connection to the primary winding at a time when the primary winding is decoupled from the energy-supplying circuit and the diode is conducting current, and to hold the sampled value at least until the diode stops conducting current. The controller circuit may also be configured to cause the held value to be the measured value used by the error circuit.

33 Claims, 4 Drawing Sheets

REGULATOR FOR ISOLATED FLYBACK POWER SUPPLY USING PRIMARY SIDE SENSING

BACKGROUND

1. Technical Field

This disclosure pertains to regulators for power supplies and, more particularly, to regulators for isolated flyback power supplies that use primary side sensing.

2. Description of Related Art

Power supplies that are used in telecommunications, health care, industry, and other applications may require electrical isolation between the input to the supply and the output from the supply. A transformer is often used to provide this isolation.

The transformer is often configured in what is known as a flyback converter. A flyback converter often regulates the output of the power supply by controlling a series of pulses that are delivered to the primary winding of the transformer. When the output needs to be increased, the on-time and/or the frequency of the pulses may be increased. Conversely, when the output needs to be decreased, the reverse may take place.

To determine how the pulses must be altered to achieve a desired output, the output of the supply is usually sensed. When complete electrical isolation must be maintained between the input and the output, this sensing must also be done in an electrically isolated manner.

To achieve this electrical isolation, an optoisolator is sometimes used to relay the output level back to the input control system. The feedback in this configuration utilizes an optical path over which electrons cannot travel. Optoisolators, however, can increase the size of the power supply, increase costs, and may limit the ability of the power supply to make needed adjustments quickly.

Another technique has been to monitor the voltage on the primary winding of the transformer in the flyback converter, commonly referred to as "primary side sensing." This monitoring has typically been done during each off period of the pulses when the primary winding has been disconnected from the supply voltage and while current is still traveling through the secondary winding of the transformer. This techniques works due to inherent characteristics of transformer. These inherent characteristics cause the voltage on the primary winding during this period to be approximately equal to the output voltage of the power supply, times the ratio of turns in the primary and secondary windings.

The output regulation that is accomplished using primary side sensing, however, may not be adequate. The regulation may not be as fast and/or as accurate as is needed. Efforts to improve the regulation, moreover, may cause the effectiveness of the regulator to become dependent upon the specific characteristics of the transformer that is used with it. This may make it difficult to design a single regulator that can be effectively used with a broad variety of transformers.

SUMMARY

A power supply having a transformer with a primary winding configured to be repeatedly coupled to and decoupled from an energy-supplying circuit and a secondary winding coupled to a diode may be regulated. The regulator may include an error circuit configured to generate an error signal representative of the difference between a target value and a measured value, a sample and hold circuit, and a controller circuit. The controller circuit may be configured to cause the sample and hold circuit to sample the value of a derived signal that is derived from a connection to the primary winding at a time when the primary winding is decoupled from the energy-supplying circuit and the diode is conducting current. The controller circuit may also be configured to cause the sample and hold circuit to hold the sampled value at least until the diode stops conducting current. The controller circuit may also be configured to cause the held value to be the measured value used by the error circuit.

Related power supplies and processes are also disclosed.

These, as well as other components, steps, features, objects, benefits, and advantages, will now become clear from a review of the following detailed description of illustrative embodiments, the accompanying drawings, and the claims.

DETAILED DESCRIPTION OF ILLUSTRATIVE EMBODIMENTS

Figure 1:
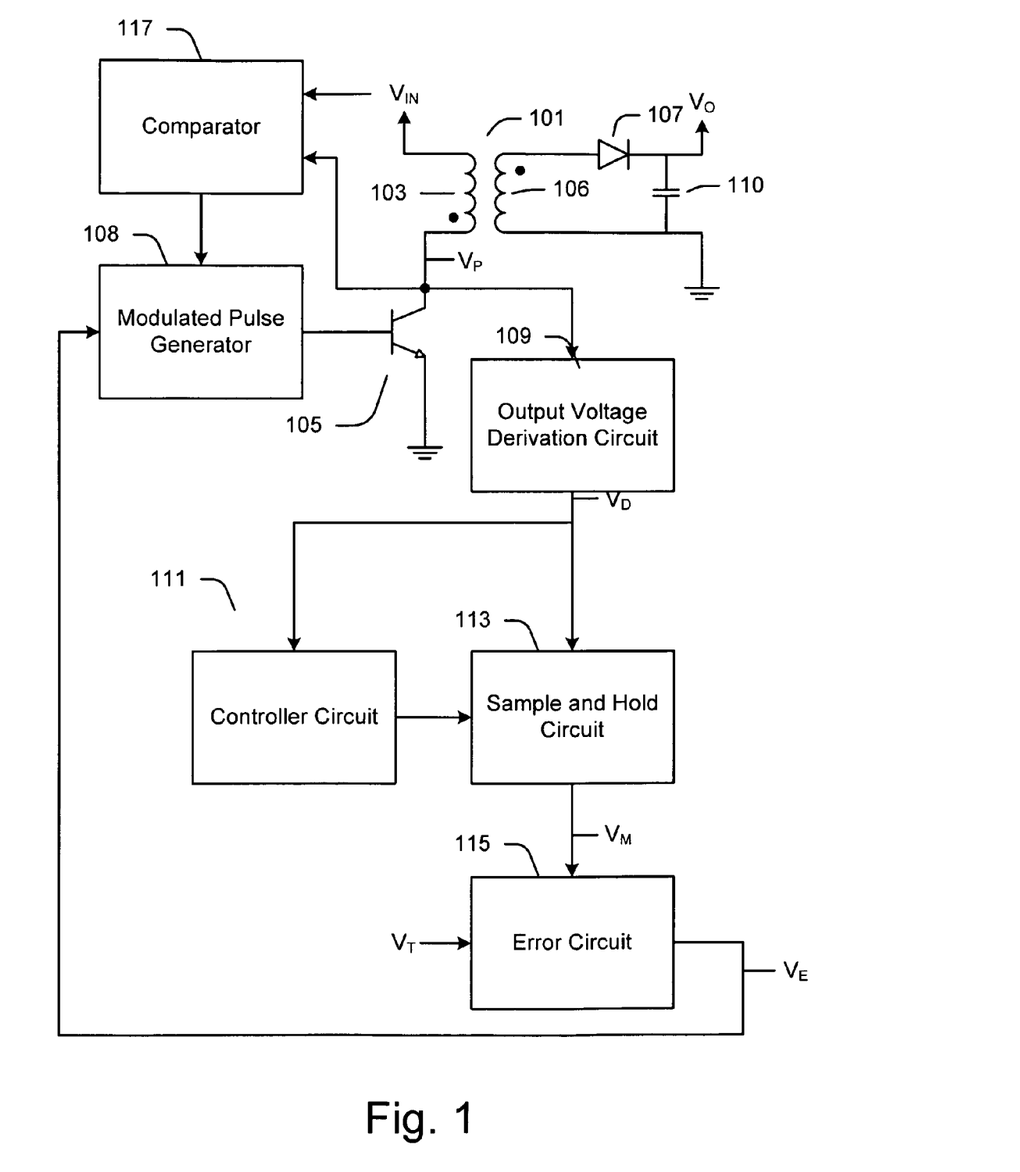
FIG. 1 illustrates a portion of an isolated flyback power supply using primary side sensing and a regulator.

FIG. 1 illustrates a portion of an isolated flyback power supply using primary side sensing and a regulator. The output of the power supply may be represented as $V_O$.

As shown in FIG. 1, the power supply may include a transformer 101 having a primary winding 103 and a secondary winding 106. The secondary winding 106 may be connected to a rectifying diode 107 and a filtering capacitor 110.

The rectifying diode 107 may be of any type. For example, it may be a Schottky diode. Similarly, the filtering capacitor 110 may be of any type. Numerous other types of rectifying and/or filtering circuits may be used in addition and/or instead. For example, multiple secondary windings may be used with rectifying diodes to generate multiple output voltages.

The primary winding 103 may be connected to an energy-supplying circuit. For example, one of the leads to the primary winding 103 may be connected to a source of energy, such as $V_{IN}$, while the other lead may be connected to a switching circuit, such as a transistor 105. Other types of switching circuits may be used in addition or instead, such as switching circuits that use MOSFETs and/or any other type of controllable switch or switches.

A modulated pulse generator 108 may be used to drive the switching circuit. The modulated pulse generator 108 may be configured to deliver a series of pulses to the switching circuit, thus causing the primary winding 103 of the transformer 101 to be repeatedly coupled to and decoupled from the energy-supplying circuit.

The modulated pulse generator 108 may be configured to vary the pattern of the pulses that are delivered to the switching circuit, thus varying the amount of energy that is delivered into the transformer 101. In turn, this may affect the output voltage $V_O$ of the power supply.

Due to inherent characteristics of the transformer 101 and as explained above, the primary voltage $V_P$ on the primary winding 103 may contain information indicative of the output voltage $V_O$ from the power supply. This may occur during periods when the pulses from the modulated pulse generator 108 are off, that is, when the transistor 105 is off, and current is traveling through the secondary winding 106 and hence the diode 107. During these periods, the primary voltage $V_P$ across the primary winding 103 may be approximately equal to $V_{IN}$ plus $V_O$, times the ratio of the turns in the primary and secondary windings.

An output voltage derivation circuit 109 may be configured to derive a derived voltage $V_D$ that is representative of the output voltage $V_O$ from $V_P$. More specifically, it may be configured to level shift $V_P$ by subtracting $V_{IN}$ from $V_P$. In addition to level shifting, the output voltage derivation circuit 109 may be configured to scale the level shifted value, an example of which is discussed below in connection with FIG. 2.

The derived voltage $V_D$ from the output voltage derivation circuit 109 may be coupled to a sample and hold circuit 113. The sample and hold circuit 113 may be configured to sample $V_D$ and to hold this value.

The derived voltage $V_D$ from the output voltage derivation circuit 109 may also be coupled to a controller circuit 111. The controller circuit 111 may be configured to cause the sample and hold circuit 113 to sample $V_D$ at one or more times and to hold one or more sampled values until one or more other times.

In one embodiment, the controller circuit 111 may be configured to cause the sample and hold circuit 113 to sample the value of $V_D$ when the primary winding 103 is decoupled from the energy-supplying circuit and when the diode 107 is conducting current. The controller circuit 111 may also be configured to cause the sample and hold circuit 113 to hold that sampled value - i.e., to preserve the sampled value even while the input $V_D$ later changes -- at least until the diode 107 stops conducting current.

The controller circuit 111 may also be configured to cause the sample and hold circuit 113 to deliver a sampled value that is held to an error circuit 115 as a measured voltage $V_M$. The error circuit 115 may be configured to generate an error voltage $V_E$ that is representative of the difference between a target voltage $V_T$ and a measured voltage $V_M$. The error voltage $V_E$ may be coupled to the modulated pulse generator 108. The modulated pulse generator 108 may be configured to alter the pattern of pulses to the transistor 105, so as to cause $V_M$ to approach and ultimately equal $V_T$, thus effectively causing the output voltage $V_O$ of the power supply to be at a desired level, as controlled by the value of $V_T$.

Any one or more of a broad variety of circuits may be used by the modulated pulse generator 108 to adjust the pattern of pulses to the transistor 105 in response to the error voltage $V_E$.

In one embodiment, the modulated pulse generator 108 may utilize pulse width modulation. The modulated pulse generator 108 may be configured to vary the width of the pulses to the transistor 105 in relation to the error voltage $V_E$. If the error voltage $V_E$ indicates that output voltage $V_O$ is too low, for example, the modulated pulse generator 108 may be configured to increase the width of each pulse. Conversely, if the error voltage $V_E$ indicates that the output voltage $V_O$ is too high, the modulated pulse generator 108 may be configured to decrease the width of each pulse.

The embodiment that has just been described is commonly known as voltage-mode PWM. Current mode PWM may be used instead. When operating in this mode, the error voltage $V_E$ may be used as a current limit for the transistor 105. When the current through the transistor 105 reaches a limit represented by $V_E$, the pulse is switched off until the modulated pulse generator 108 turns the pulse back on.

When using pulse width modulation, the period of each pulse may remain constant. Under certain conditions, this may cause the transistor 105 to remain open while no current is being conducted through the diode 107. This may require the transformer 101 to be sized so that it is capable of delivering a needed quantity of energy during only a portion of its use. In turn, this may require a bulkier and potentially more expensive transformer than might otherwise be needed if the energy required by the load was supplied by the transformer over a greater portion of its switching cycle.

To maximize efficiency, the modulated pulse generator 108 may instead or in addition be configured to turn the transistor 105 back on as soon as the current through the diode 107 stops. To detect this, a comparator 117 may be configured to compare $V_P$ with $V_{IN}$ and to signal the modulated pulse generator 108 that current through the diode 107 has ceased when $V_P$ crosses a threshold that is just slightly higher than $V_{IN}$. The modulated pulse generator 108 may be configured to then turn the pulse back on.

$V_D$ may be compared to $V_T$ as an alternate or additional means of determining when the current through the diode 107 has stopped. When $V_D$ reaches approximately 90% of $V_T$, for example, this may be interpreted by a comparator circuit (not shown) as meaning that the current through the diode 107 has stopped. Other techniques for determining when the current though the diode 107 stops may be used in addition or instead.

Errors in the feedback system that has just been described can still be caused by a variety of factors. For example, errors can be caused by the voltage drop that may take place in the secondary winding 106 of the transformer due to its internal resistance. Errors may similarly be caused by the voltage drop caused by the diode 107. These voltage drops may cause the output voltage $V_O$ not to be truly reflected in the value of $V_P$.

These errors may be particularly problematic because they may be a function of the current that is being drawn by the load that is connected to the output voltage $V_O$. Both the voltage drop caused by the diode 107 and the internal resistance of the secondary winding 106 may vary as a function of this current. The variation in the voltage drop caused by the diode 107, moreover, may not even be linear.

To help minimize this problem, the controller circuit 111 may be configured to cause the value of $V_D$ that is sampled and held to be the value that $V_D$ had just slightly before the diode 107 stops conducting current. At this point in time, the current through the diode 107 may be very low, thus minimizing the error that might otherwise be caused by the voltage drops caused by the internal resistance of the secondary winding 106 and the diode 107. The controller circuit 111 may also be configured to cause the sample and hold circuit 113 to deliver this just-before-the-current-stops held value of $V_D$ to the error circuit 115 as $V_M$. The controller circuit 111 may be configured to cause this value to be held by the error circuit 115 as $V_M$ until the next cycle when the current through the diode 107 has again reached this low value and the held value may be updated with a more recent measurement.

The moment when the controller circuit 111 causes the value of $V_D$ to be held may vary. In one embodiment, the controller circuit 111 may be configured to cause the value of $V_D$ to be sampled and held by the sample and hold circuit 113 within no more than 300 nanoseconds before the current through the diode 107 stops. The cessation of current through the diode 107 stops may detected using the comparator 117 and/or or the other techniques discussed above and/or any other technique. In another embodiment, the controller circuit 111 may be configured to cause the value of $V_D$ to in addition or instead be sampled and held when the amount of current through the diode 107 goes below 25% of its average conducting value, i.e., below 25% of the average value of the current that has been flowing through the diode 107 during one off period of the pulses to the transistor 105.

Examples of specific circuits that may be used to implement some of the circuits generally described above in connection with FIG. 1 will now be illustrated and discussed. Numerous variations of each may be used in addition or instead. Following a brief description of these specific circuits, one illustrative mode of their operation will be discussed in connection with the signals illustrated in FIG. 5.

Figure 2:
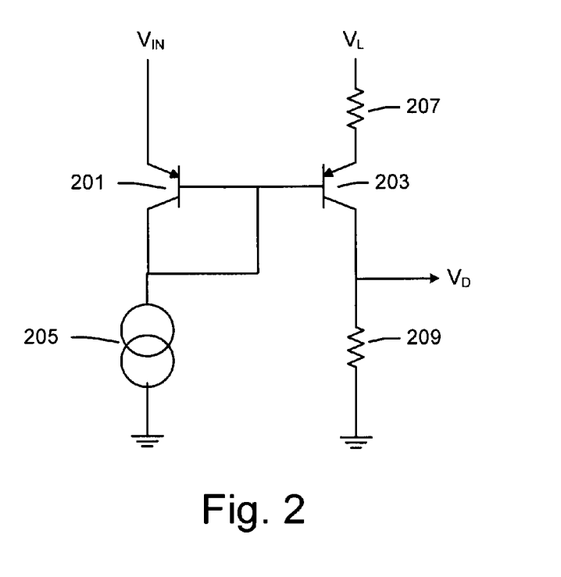
FIG. 2 is an example of the output voltage derivation circuit that is shown in FIG. 1.

FIG. 2 is an example of the output voltage derivation circuit 109 that is shown in FIG. 1. As shown in FIG. 2, the circuit may include a transistor 201 configured as a diode, a transistor 203, a current supply 205, a resistor 207, and a resistor 209. The circuit may function as an emitter follower to force the emitter of the transistor 203 to $V_{IN}$.

The current supply 205 may be set at any amount needed to forward bias the diode-connected transistor 201. In one embodiment, a current of approximately 20 micro amps may be used.

The values of the resistors 207 and 209 may be selected so as to control the scaling of the level-shifted voltage. In one embodiment, the resisters may be selected so as to substantially satisfy the following equation:

$$V_D = \left( \frac{V_L - V_{IN}}{R_{207}} * R_{209} \right),$$

The error circuit 115 may minimize the error between $V_D$ and $V_T$ with the aid of the sample and hold circuit 113. The voltage across the primary winding, $V_L$-$V_{IN}$, may equal the voltage across the secondary times the turns ratio N of the transformer. In one embodiment, the resisters may be selected so as to satisfy the following equation:

$$V_{OT} = \left( \frac{V_T}{N} * \frac{R_{207}}{R_{209}} \right),$$

When the values of the resistors 207 and 209 are selected in conformance with this equation, $V_D$ may be approximately $V_T$ when the output voltage $V_O$ has reached the target output voltage $V_{OT}$. The voltage $V_T$ may be 1.25 volts which may be called the bandgap voltage. When used in conjunction with appropriate circuitry, this value may minimize drifts and other temperature-dependent errors.

Figure 3:
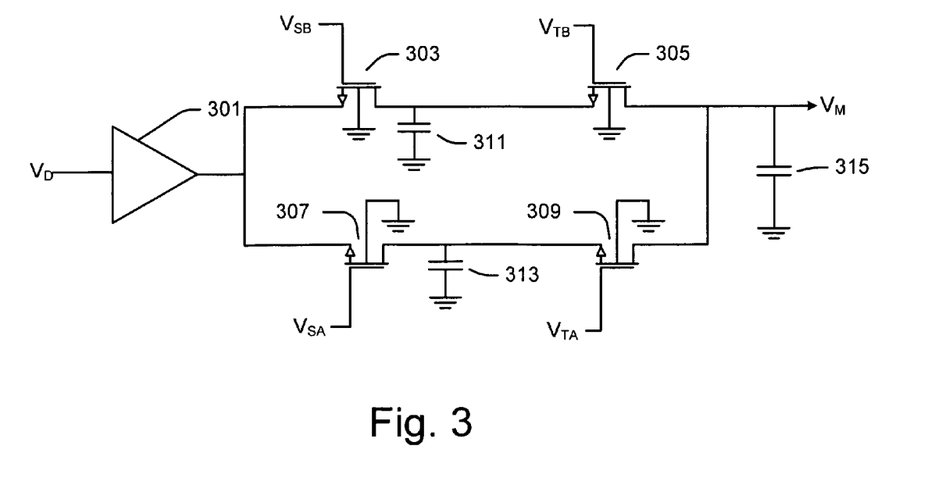
FIG. 3 is an example of the sample and hold circuit that is shown in FIG. 1.

FIG. 3 is an example of the sample and hold circuit 113 that is shown in FIG. 1. As shown in FIG. 3, the circuit may include a buffer 301, a plurality of controllable switches, such as MOSFETs 303, 305, 307, and 309, and a plurality of storage devices, such as capacitors 311, 313, and 315. Other types of controllable switches and/or storage devices may be used in addition or instead, including FETS, BJTs, SCRs for the switches and/or inductors for the storage devices.

As shown in FIG. 3, MOSFET 303 may be configured to cause the capacitor 311 to charge to the value $V_D$ when a sample voltage $V_{SB}$ goes high. MOSFET 307 may similarly be configured to cause the capacitor 313 to charge to the value of $V_D$ when a sample voltage $V_{SA}$ goes high.

MOSFET 305 may be configured to transfer charge from the capacitor 311 to the capacitor 315 when a transfer voltage $V_{TB}$ goes high. MOSFET 309 may be similarly be configured to transfer charge from the capacitor 313 to the capacitor 315 when a transfer voltage $V_{TA}$ goes high.

MOSFETs 305 and 309 may collectively be considered to be a controllable switching network that may be controlled by appropriate transfer voltages $V_{TB}$ and $V_{TA}$ to cause the charge that is delivered to the capacitor 315 to come from either the capacitor 311 or the capacitor 313.

The value of the capacitors 311 and 313 may be selected so as to be at least five times the value of the capacitor 315. In one embodiment, the capacitors 311 and 313 may be approximately 10 picofarads, while the capacitor 315 may be 1 picofarad. This may cause the voltage that is on the capacitor 311 to be approximately copied to the capacitor 315 when the MOSFET 305 is closed. Similarly, this may cause the voltage that is on the capacitor 313 to be approximately copied to the capacitor 315 when the MOSFET 309 is closed.

The nature of the four voltages $V_{SB}$, $V_{SA}$, $V_{TB}$, and $V_{TA}$ that are shown in FIG. 3 and the consequences that they cause are discussed below in connection with the discussion of FIG. 5.

Figure 4:
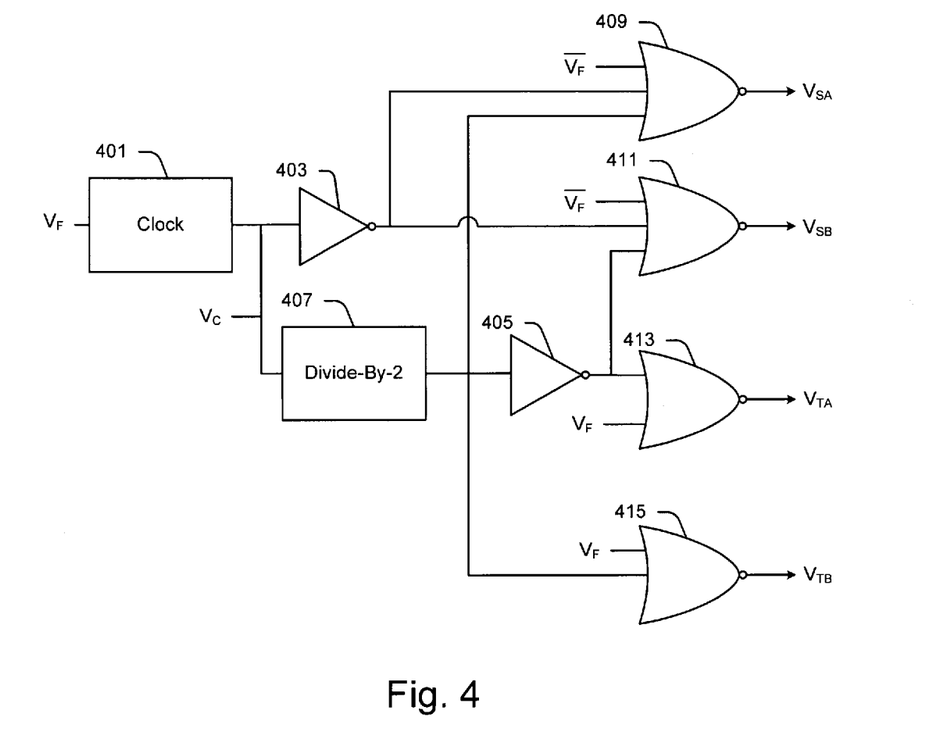
FIG. 4 is an example of the controller circuit that is shown in FIG. 1.

FIG. 4 is an example of the controller circuit 111 that is shown in FIG. 1. As shown in FIG. 4, the controller circuit may include a clock 401, inverters 403 and 405, a divide-by-two circuit 407, and NOR gates 409, 411, 413, and 415.

The clock 401 may be configured so as to be gated on and off by a feedback voltage $V_F$. The feedback voltage $V_F$ may be a logic signal that goes high when the transistor 105 opens and goes low when the current through the diode 107 stops. Using well known techniques, the rising edges for $V_F$ may be derived from the rising edges of the pulses that are generated by the modulated pulse generator 108. The rising edges of $V_F$ may be delayed in certain embodiments so as to eliminate the processing of $V_D$ during its very early stages when it is reflecting spurious peak voltages due to leakage inductance in the transformer 101. The falling edges of $V_F$ may be derived from the falling edges of the derived voltage $V_D$. Other means of generating $V_F$ may be used in addition or instead.

The clock 401 may produce a clock voltage $V_C$ of any type and at any frequency. In one embodiment, $V_C$ may oscillate at a frequency of between 4 MHz and 6 MHz, such as at a frequency of 5 MHz. It may have a duty cycle that is on for no more than 40% of the time, such as having a high period of approximately 70 nanoseconds and a low period of approximately 140 nanoseconds.

The controller circuit may be configured as is shown in FIG. 4 to generate the voltages $V_{SB}$, $V_{SA}$, $V_{TB}$, and $V_{TA}$ that are used by the circuit shown in FIG. 3. Other devices and/or configurations shown in FIG. 4 may be used in addition or instead. The nature of one example of these control voltages will now be discussed in connection with FIG. 5.

Figure 5:
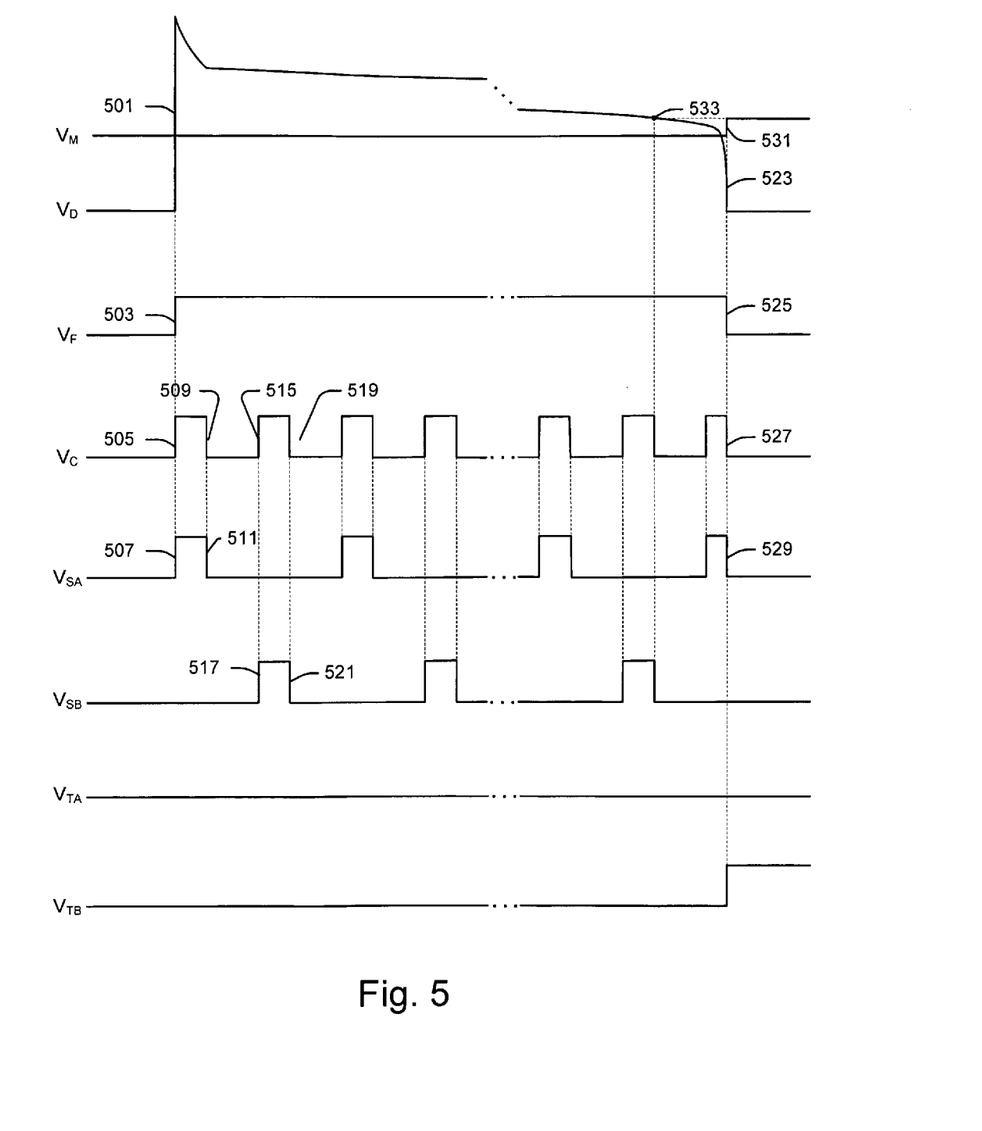
FIG. 5 illustrates signals that may be found in one or more of the circuits illustrated in FIGS. 1-4.

FIG. 5 illustrates signals that may be found in one or more of the circuits illustrated in FIGS. 1-4.

One such signal is $V_D$, the voltage that is derived by the output voltage derivation circuit 109 shown in FIGS. 1 and FIG. 2. As discussed above, $V_D$ may represent a level shifted and scaled version of the output voltage $V_O$ while the transistor 105 is open and the diode 107 is conducting current.

FIG. 5 also illustrates $V_F$, the feedback voltage that may rise when the transistor 105 is open and may fall when the current though the diode 109 stops.

FIG. 5 also illustrates the clock voltage $V_C$. Because the clock 401 may be gated by $V_F$, the clock signal $V_C$ may not begin until $V_F$ goes high.

FIG. 5 also illustrates the sample voltages $V_{SA}$ and $V_{SB}$ that are generated by the controller circuit that is illustrated in FIG. As shown in FIG. 5, $V_{SA}$ may be shifted in phase from $V_{SB}$. The controller circuit may also be configured to prevent $V_{SA}$ from overlapping with $V_{SB}$, as also shown in FIG. 5.

FIG. 5 also illustrates the held measured voltage $V_M$ from the sample and hold circuit 113, an example of which is illustrated in FIG. 3.

An example of one mode of interaction between all of these signals will now be described.

As explained above, $V_D$ may go high at a rising edge 501 as soon as the transistor 105 is opened. In turn, this may cause $V_F$ to go high at a rising edge 503, thus starting the generation of the clock pulses $V_C$ at a rising edge 505. By virtue of the logic circuitry shown in FIG. 4, the gating signal $V_{SA}$ may go high at a rising edge 507, causing the value of $V_D$ to be stored on the capacitor 313 in FIG. 3.

The logic circuit in FIG. 4 may cause the first falling edge 509 of $V_C$ to turn off $V_{SA}$ at a falling edge 511, thus causing the last sampled value of $V_D$ to be held by the capacitor 313. On the next rising edge 515 of the clock $V_C$, the gating signal $V_{SB}$ may go high at a rising edge 517, causing the value of $V_D$ to be stored on the capacitor 311. The logic circuit shown in FIG. 4 may then cause the gating signal $V_{SB}$ to go low on the next falling edge 519 of $V_C$ at a falling edge 521, thus causing the last sampled value of $V_D$ to be held on the capacitor 311.

This process of causing the value of $V_D$ to be alternately sampled and held on the capacitors 311 and 313 may continue until such time as the current stops flowing through the diode 107, as reflected by a falling edge 523 of $V_D$.

The falling edge 523 of $V_D$ may cause $V_F$ to go low at a falling edge 525 which may cause all further clock pulses to stop. What happens next may depend upon the state of the clock and the logic at the time that the current through the diode 107 stops.

If the clock voltage $V_C$ is high when $V_F$ goes low, the falling edge of $V_F$ may cause $V_C$ to fall at a falling edge 527.

If $V_{SA}$ also happens to high when $V_F$ goes low, the falling edge 525 of $V_F$ may also cause $V_{SA}$ to go low at a falling edge 529. This may cause the capacitor 313 to hold a zero or near zero value of $V_D$ that is not representative of $V_O$. The last value of $V_D$ that was held before the current through the diode 107 stops may be the best representation of $V_O$. In this example, this value was held in the capacitor 311. The logic shown in FIG. 4 thus causes $V_{TB}$ to go high, causing the value that was held in the capacitor 311 to be transferred to the capacitor 315. This may thus cause $V_M$ to change, as illustrated by a rising edge 531. The new value of $V_M$ is approximately equal to the voltage that was stored and last held in the capacitor 311, as reflected by a voltage point 533. Of course, $V_m$ could instead have gone down in value, up in a different amount, or remained substantially the same, all depending on any changes that might have occurred to output voltage $V_o$ since the previous cycle.

The current through the diode 107 might instead stop flowing when $V_{SB}$ is high. In this event, the logic circuit shown in FIG. 4 may instead cause the transfer voltage $V_{TA}$ to go high when $V_F$ goes low, i.e., on the falling edge 525 of $V_F$. This may instead cause the voltage on the capacitor 313 to transfer to the capacitor 315, thus establishing the voltage on the capacitor 313 as the new value for $V_M$.

The current through the diode 107 may instead stop while $V_c$ is low. In this case, the logic circuit shown in FIG. 4 may cause the value that was last held to be transferred to the capacitor 315, be it have been in the capacitor 311 or the capacitor 313. If $V_{SA}$ was just high, for example, the transfer voltage $V_{TB}$ may go high. This may cause the voltage on capacitor 313 to transfer to the capacitor 315. This may be accomplished by causing either $V_{TB}$ or $V_{TA}$ to go high when $V_F$ goes low on its falling edge 525.

In other words, the logic circuit shown in FIG. 4 may be configured to cause the last value that was held on either the storage capacitor 311 or 313 before the current through the diode 107 stops to be transferred to the capacitor 315 after the current through the diode 107 stops. This transferred value may serve as the measured voltage $V_M$ that is processed by the error circuit 115. This may insure that a valid value is used throughout the feedback process.

This sequence of events may also help insure that the derived value of the output voltage $V_O$ that is used in the feedback circuit is based on a value of the primary voltage $V_P$ that existed just before the current through the diode 107 stopped, i.e., when the current was very low. As explained above, this may help minimize errors caused by the resistance in the secondary winding 106 of the transformer 101 and the non-linear voltage drop caused by the diode 107.

The frequency of the clock signal $V_C$ may be selected to insure that the last held value of $V_D$ is always very close to the point when the diode 107 stops conducting current. In one embodiment, the clock frequency may be selected such that the sample that is held by the capacitor 315 is taken within no more than 300 nanoseconds before the diode stops conducting current. If a clock frequency of approximately 5 MHz is selected, for example, the sample that is held and used as $V_M$ will have been taken within no more than 150 nanoseconds before the diode stops conducting current.

Other or additional criteria may be used for establishing the required timing. For example, the frequency of the clock pulses may be selected so that the last sample that is held is not taken until after the current flowing through the diode has dropped below 25% of its average conducting value. Other standards may be employed in addition or instead.

Varying the duty cycle of the clock signal $V_C$ may assist in insuring that the held sample that is used as $V_M$ is taken before the $V_D$ voltage falls and becomes invalid. There may be some delay between when the $V_D$ becomes invalid and $V_F$ goes low. For example, the clock 401 may be configured so as to cause the clock signal $V_C$ to be high for 40% or less of its period, such as to be high for approximately 70 nanoseconds and low for approximately 140 nanoseconds. Because of the logic circuit shown in FIG. 4, this unequal duty cycle may cause the width of each pulse in the sample voltages $V_{SA}$ and $V_{SB}$ to decrease, thus increasing the chance that a sample that is taken by a capacitor 311 or 313 will be held in that capacitor by the sample voltage $V_{SA}$ or $V_{SB}$ going low before the current through the diode 107 stops.

If the sample period of the sample voltages $V_{SA}$ and $V_{SB}$ is too short, on the other hand, this may impair the ability of their associated capacitors to charge to the value of $V_D$ before the falling edge of the sample voltage halts the charging process. This may affect the ultimate accuracy of the regulation and/or the speed at which it is achieved.

In some embodiments, the sampled value of $V_D$ that is held just prior to the falling edge 525 of $V_F$ could fail to contain an accurate representation of $V_O$. This could be due to a lack of synchronism between $V_F$ and the actual shutdown of current through the diode 107 and/or a delay in recognizing its falling edge 525. The current through the diode 107 may also be too low at the time for an accurate reading. This could be particularly true when the falling edge 525 of $V_F$ takes place immediately following a falling edge of the clock voltage $V_C$. To help minimize such an error, the controller circuit 111 may be configured to cause the sample and hold circuit 113 to deliver the second-to last held value of $V_D$ as $V_M$, rather than the last held value. The controller circuit 111 may instead be configured to deliver an even earlier-held value of $V_D$, in which event the sample and hold circuit 113 may be modified to hold such an earlier value.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently. In short, the scope of protection is limited solely by the claims that now follow. That scope is intended to be as broad as is reasonably consistent with the language that is used in the claims and to encompass all structural and functional equivalents.

The phrase "means for" when used in a claim embraces the corresponding structure and materials that have been described and their equivalents. Similarly, the phrase "step for" when used in a claim embraces the corresponding acts that have been described and their equivalents. The absence of these phrases means that the claim is not limited to any corresponding structures, materials, or acts.

Nothing that has been stated or illustrated is intended to cause a dedication of any component, step, feature, object, benefit, advantage, or equivalent to the public, regardless of whether it is recited in the claims.

I claim:

1. A regulator for a power supply having a transformer with a primary winding configured to be repeatedly coupled to and decoupled from an energy-supplying circuit and a secondary winding coupled to a diode, comprising:
   an error circuit configured to generate an error signal representative of the difference between a target value and a measured value;
   a sample and hold circuit; and
   a controller circuit configured to:
      cause the sample and hold circuit to:
         sample the value of a derived signal that is derived from a connection to the primary winding at a time when the primary winding is decoupled from the energy-supplying circuit and the diode is conducting current; and
         hold the sampled value at least until the diode stops conducting current; and
      cause the held value to be the measured value used by the error circuit.

2. The regulator of claim 1 wherein:
   the sample and hold circuit is configured to sample and hold at least two values; and
   the controller is configured to cause the sample and hold circuit to sample the value of the derived signal on different occasions and to simultaneously hold at least two of the samples.

3. The regulator of claim 2 wherein the controller is configured to cause one of the values that is simultaneously held by the sample and hold circuit to be the measured value used by the error circuit.

4. The regulator of claim 3 wherein the controller is configured to cause the last value that is held prior to when the diode stops conducting current to be the measured value used by the error circuit.

5. The regulator of claim 3 wherein the controller is configured to cause the second-to-last last value that is held prior to when the diode stops conducting current to be the measured value used by the error circuit.

6. The regulator of claim 2 wherein the controller includes a clock.

7. The regulator of claim 6 wherein the clock is gated.

8. The regulator of claim 6 wherein the clock generates a signal that has a substantially unequal duty cycle.

9. The regulator of claim 6 wherein the controller includes logic that generates two gating signals from a signal generated by the clock that are out of phase with each other.

10. The regulator of claim 9 wherein the logic generates four gating signals from a signal generated by the clock.

11. The regulator of claim 9 wherein the logic includes a divide-by-two circuit.

12. The regulator of claim 9 wherein the logic includes four OR gates.

13. The regulator of claim 9 wherein the logic includes two inverters.

14. The regulator of claim 9 wherein the two gating signals do not overlap.

15. The regulator of claim 9 wherein the period of each gating signal is less than 500 ns.

16. The regulator of claim 2 wherein:
   the sample and hold circuit includes:
      a first storage device and a first controllable switch configured to controllably cause energy representative of the value of the derived signal to be stored in the first storage device; and
      a second storage device and a second controllable switch configured to controllably cause energy representative of the value of the derived signal to be stored in the second storage device; and
   the controller is configured to:
      cause the first controllable switch to cause energy representative of the value of the derived signal to be stored in the first storage devices on a first different occasion; and
      cause the second controllable switch to cause energy representative of the value of the derived signal to be stored in the second storage device on a second occasion different from the first.

17. The regulator of claim 16 wherein the first and second storage devices each include a capacitor and wherein the stored energy is a charge.

18. The regulator of claim 16 wherein:
   the sample and hold circuit includes a third storage device and a controllable switching network configured to controllably cause energy representative of the value represented by the energy stored in either the first or the second storage device to be stored in the third storage device; and
   the controller is configured to cause the controllable switching network to cause the energy representative of the value represented by the energy stored in either the first or the second storage device to be stored in the third storage device.

19. The regulator of claim 18 wherein the third storage device includes a capacitor and wherein the stored energy is a charge.

20. The regulator of claim 18 wherein the controllable switching network includes a third and a forth controllable switch.

21. The regulator of claim 18 configured to cause the value represented by the energy stored in the third storage device to be the measured value used by the error circuit.

22. The regulator of claim 18 wherein the switching network is configured to transfer energy from either the first or the second storage device to the third storage device and wherein the first and the second storage devices each have a storage capacity that is at least five times the storage capacity of the third storage device.

23. The regulator of claim 1 wherein the controller is configured to cause the sample that is held to be taken within no more than 300 ns before the diode stops conducting current.

24. The regulator of claim 1 wherein the controller is configured to cause the sample that is held to be taken after the current flowing through the diode has dropped below 25 percent of its average conducting value.

25. A regulator for a power supply having a transformer with a primary winding configured to be repeatedly coupled to and decoupled from an energy-supplying circuit and a secondary winding coupled to a diode, comprising:
error means for generating an error signal representative of the difference between a target value and a measured value;
sample and hold means for sampling and holding a value; and
controller means for:
causing the sample and hold means to:
sample the value of a derived signal that is derived from a connection to the primary winding at a time when the primary winding is decoupled from the energy-supplying circuit and the diode is conducting current; and
hold the sampled value at least until the diode stops conducting current; and
cause the held value to be the measured value used by the error means.

26. The regulator of claim 25 wherein the controller means is also for causing the sample that is held to be taken after the current flowing through the diode has dropped below 25 percent of its average conducting value.

27. A regulator for a power supply having a transformer with a primary winding configured to be repeatedly coupled to and decoupled from an energy-supplying circuit and a secondary winding coupled to a diode, comprising a controller circuit configured to:
cause a sample and hold circuit to:
sample the value of a derived signal that is derived from a connection to the primary winding at a time when the primary winding is decoupled from the energy-supplying circuit and the diode is conducting current; and
hold the sampled value at least until the diode stops conducting current; and
cause the held value to be evaluated by an error circuit.

28. The regulator of claim 27 wherein the controller is configured to cause the sample that is held to be taken when the current flowing through the diode has dropped below 25 percent of its average conducting value.

29. A power supply comprising:
a transformer having a primary and a secondary winding;
a diode coupled to the secondary winding;
an error circuit configured to generate an error signal representative of the difference between a target value and a measured value;
a sample and hold circuit; and
a controller circuit configured to:
cause the sample and hold circuit to:
sample the value of a derived signal that is derived from a connection to the primary winding at a time when the primary winding is decoupled from the energy-supplying circuit and the diode is conducting current; and
hold the sampled value at least until the diode stops conducting current; and
cause the held value to be the measured value used by the error circuit.

30. The power supply of claim 29 further comprising:
a switching circuit configured to couple the primary winding to and decoupled the primary winding from an energy-supplying circuit; and
a modulated pulse generator configured to drive the switching circuit with a series of pulses modulated by the error signal.

31. The regulator of claim 29 wherein the controller is configured to cause the sample that is held to be taken when the current flowing through the diode has dropped below 25 percent of its average conducting value.

32. A process for regulating a power supply having a transformer with a primary winding that is repeatedly coupled to and decoupled from an energy-supplying circuit and a secondary winding coupled to a diode, comprising:
sampling the value of a derived signal that is derived from a connection to the primary winding at a time when the primary winding is decoupled from the energy-supplying circuit and the diode is conducting current;
holding the sampled value at least until the diode stops conducting current;
generating an error by determining the difference between the held value and the target value; and
regulating the power supply based on the error.

33. The process of claim 32 wherein the sample that is held is taken when the current flowing through the diode has dropped below 25 percent of its average conducting value.

* * * * *